Figure 1:
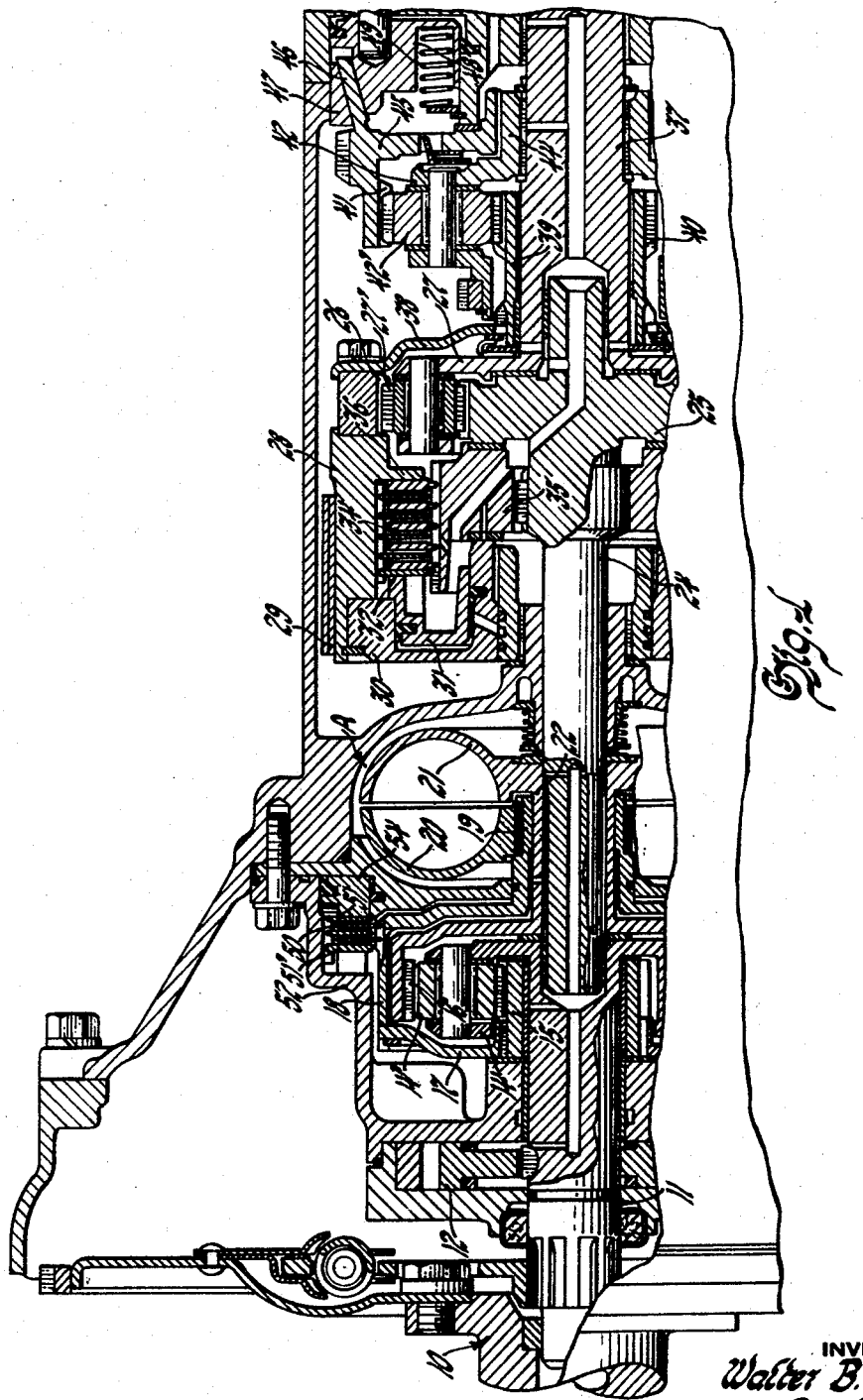

May 3, 1960 W. B. HERNDON 2,934,976
AUTOMATIC PLURAL STEP RATIO TRANSMISSIONS
Filed Oct. 22, 1953 5 Sheets-Sheet 1

INVENTOR
Walter B. Herndon
BY T. L. Chisholm
ATTORNEY

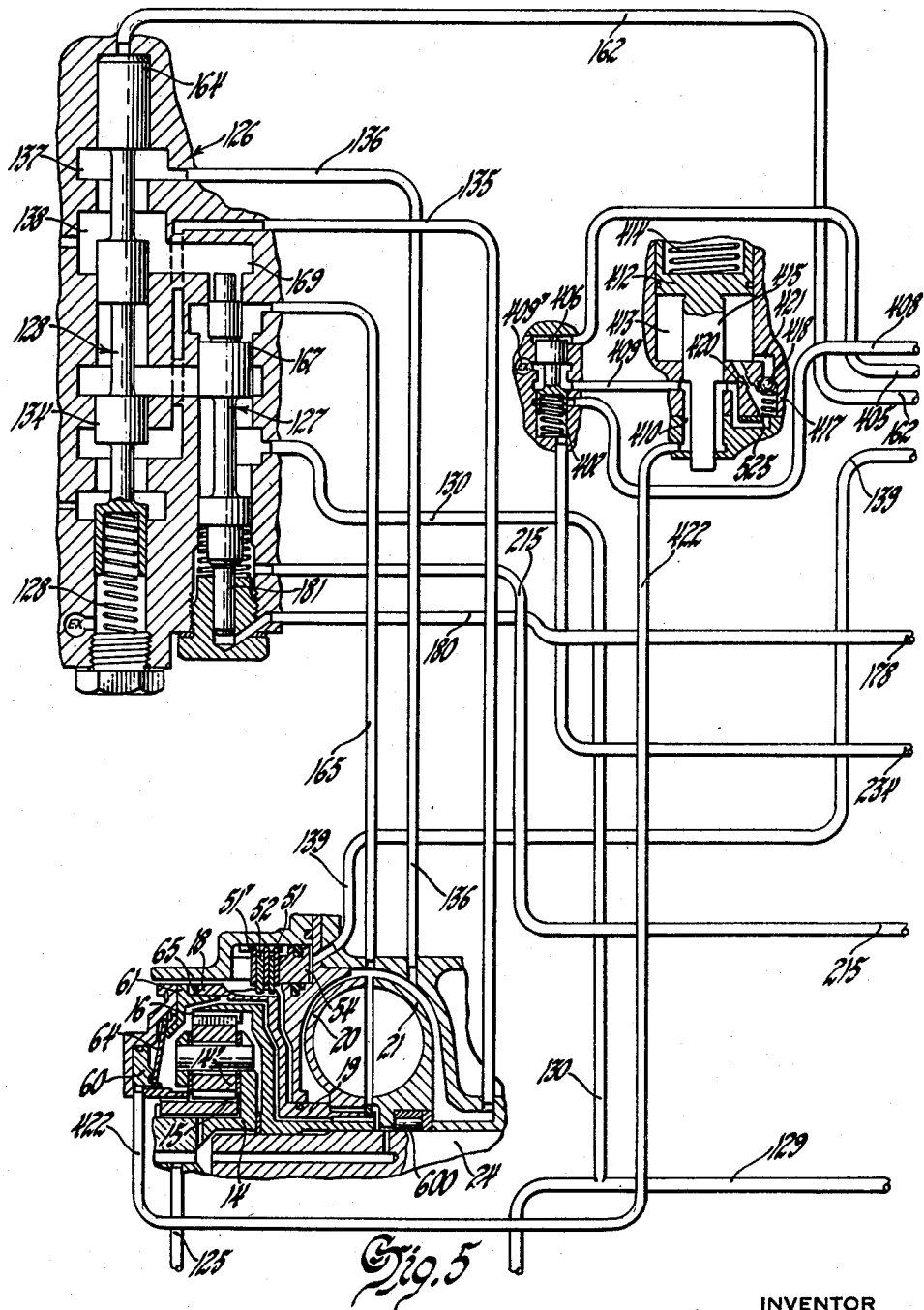

United States Patent Office 2,934,976
Patented May 3, 1960

2,934,976
AUTOMATIC PLURAL STEP RATIO TRANSMISSIONS

Walter B. Herndon, Rochester, Mich., assignor to General Motors Corporation, Detroit, Mich., a corporation of Delaware Application October 22, 1953, Serial No. 387,720

3 Claims. (Cl. 74—754)

This invention relates to improvements in automatic plural step ratio transmissions and more particularly to such transmissions employing a fluid coupling which can be filled for certain ratios and which can be emptied when other ratios are established.

In transmissions as just described, and more particularly in those employing compounded planetary gear units, it has been found desirable to operate at least one of these units in such fashion that the coupling between elements of the unit can be accomplished smoothly, can be sustained for prolonged periods, and can be released while another condition is being established without releasing the transmission of torque through the unit. Furthermore, it has been found that a fluid coupling can be used advantageously in lieu of a disk clutch for establishing one ratio condition of a planetary unit, particularly direct drive therethrough, wherein it is essential to so connect or couple two of the elements of the planetary unit as to cause them to rotate together and hence compel rotation of all of the elements of the unit in unison. The action of the coupling can be controlled to cause transmission of torque therethrough or to disable the same when another drive condition is established in the unit.

An object of the present invention is to provide a transmission wherein certain elements of a gear unit are connected for drive purposes through the agency of a fluid coupling which can be activated for drive and which can be deactivated when other ratio conditions are established in the unit.

Another object of the invention is to provide a transmission made up of a plurality of planetary gear units in series in which at least one of the units is provided with a fluid coupling for connecting in drive relation elements of the unit with provision for disabling the coupling when other drive connections are assumed.

Another object of the invention is to provide a transmission, as just described, in which initiation of drive therethrough is accomplished by means of the fluid coupling which can operate independently under load.

A further object of the invention is to provide a transmission, as previously described, in which the control of the fluid coupling is accomplished automatically to fill the coupling with liquid when it is desired to transmit torque therethrough and to empty the coupling when torque is transmitted through another path employing elements of a transmission unit.

An additional object of the invention is to provide automatic controls whereby a fluid coupling can be energized for the transmission of torque therethrough and can be de-energized without emptying when torque is transmitted through another path.

Another object of the invention is to provide controls operative to vary the degree of coupling action in relation to torque demand and vehicle speed, or speed of a part of the transmission.

In carrying out the foregoing and other objects of the invention, use is made of a transmission of well-known type employing two planetary gear units in series for forward drive with a third planetary unit operatively connected thereto and capable of functioning to impart reverse rotation to the output shaft of the transmission. One of the forward drive units, preferably the unit receiving drive directly from the engine, has incorporated therein a fluid coupling so associated with two of the elements of the planetary unit that when drive from the engine is accomplished through a third element the two elements coupled by the fluid coupling can be progressively brought to the speed of the driving element so that the entire unit rotates substantially in unison, and a shaft driven by one of the coupled elements rotates at input shaft speed. A separate brake can be employed to lock one of the coupled elements against rotation for establishing another torque transmission path through the unit, such as a geared path, with the result that if drive from the engine is communicated to the carrier of the unit the unit can be operated either in direct drive through the fluid coupling or in geared overdrive by establishing reaction in one of the elements through the agency of the brake.

Energization and de-energization of the fluid coupling for the alternate establishment and disestablishment of direct drive through the planetary gear unit can be accomplished either by filling and emptying the coupling or by providing a one-way freewheeling clutch which will permit the coupling to be de-energized without emptying thereof. This clutch can be associated with the driven element of the coupling, i.e., the turbine, so that the shaft normally driven thereby in direct drive can rotate independently of the turbine in an overdrive ratio.

With this arrangement it is possible to utilize the fluid coupling to perform the functions of a friction clutch without incurring the disadvantages inherent in such mechanism. It is well known that a fluid coupling can slip indefinitely without harm thereto, the only deleterious results being the dissipation of energy in heating the liquid therein. Thus a fluid coupling, upon assuming a load, may slip indefinitely or at least progressively until full coupling occurs, at which time the device functions almost in the same manner as a direct drive mechanism with a minimum of disparity between speeds of rotation of the pump and turbine thereof. Consequently, in a transmission operating to provide four forward speeds it is possible to condition the first unit to employ the fluid coupling in first and third ratios and to disable the same in second and fourth ratios, during which latter conditions direct drive from the engine through the first unit to the second planetary unit and through it to the output shaft can be accomplished. The transmission further will utilize the advantages of the fluid coupling for reverse drive, in which condition the first unit will be operated in a manner corresponding to first or third ratios in forward drive.

Figure 2:
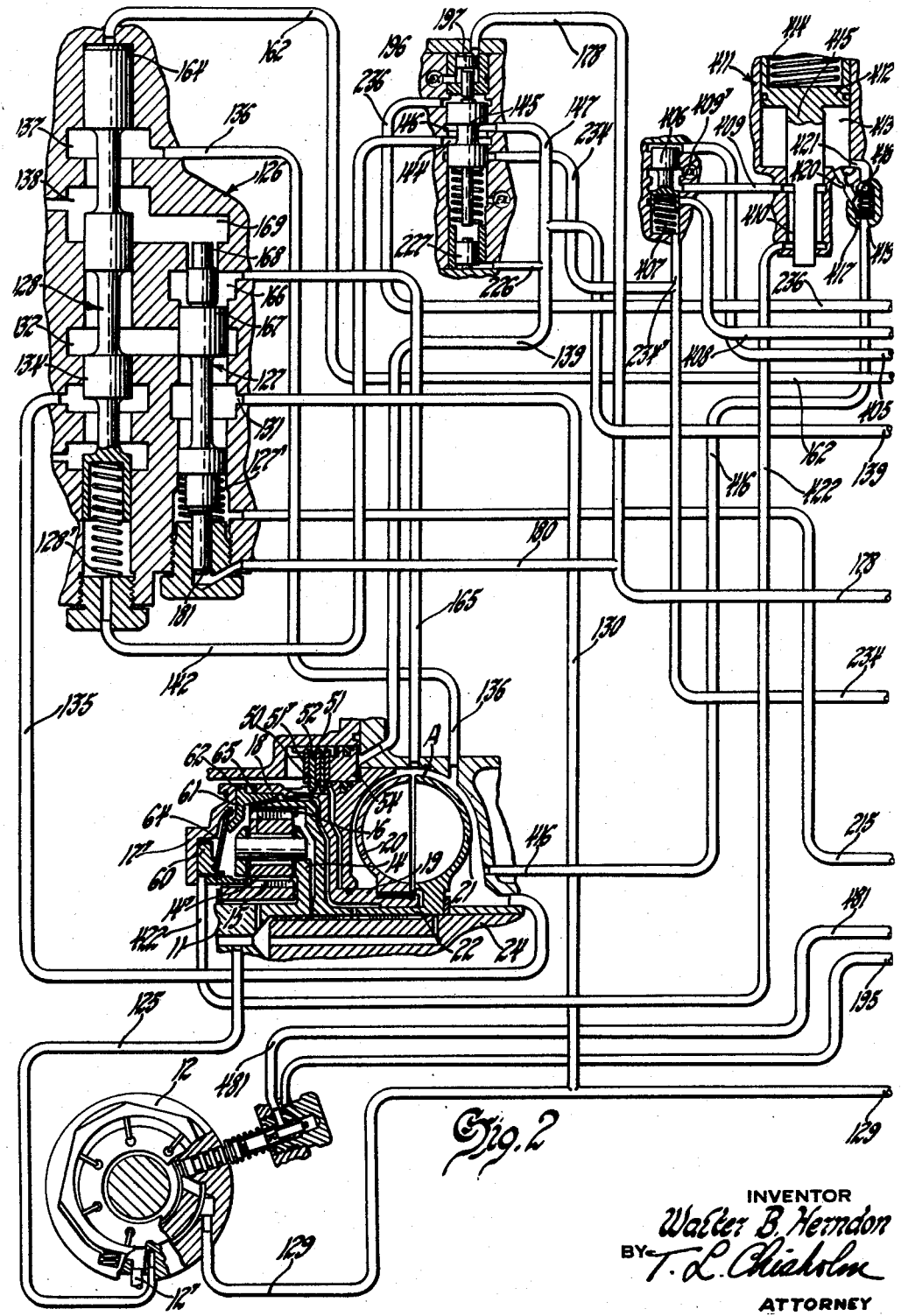
Figure 3:
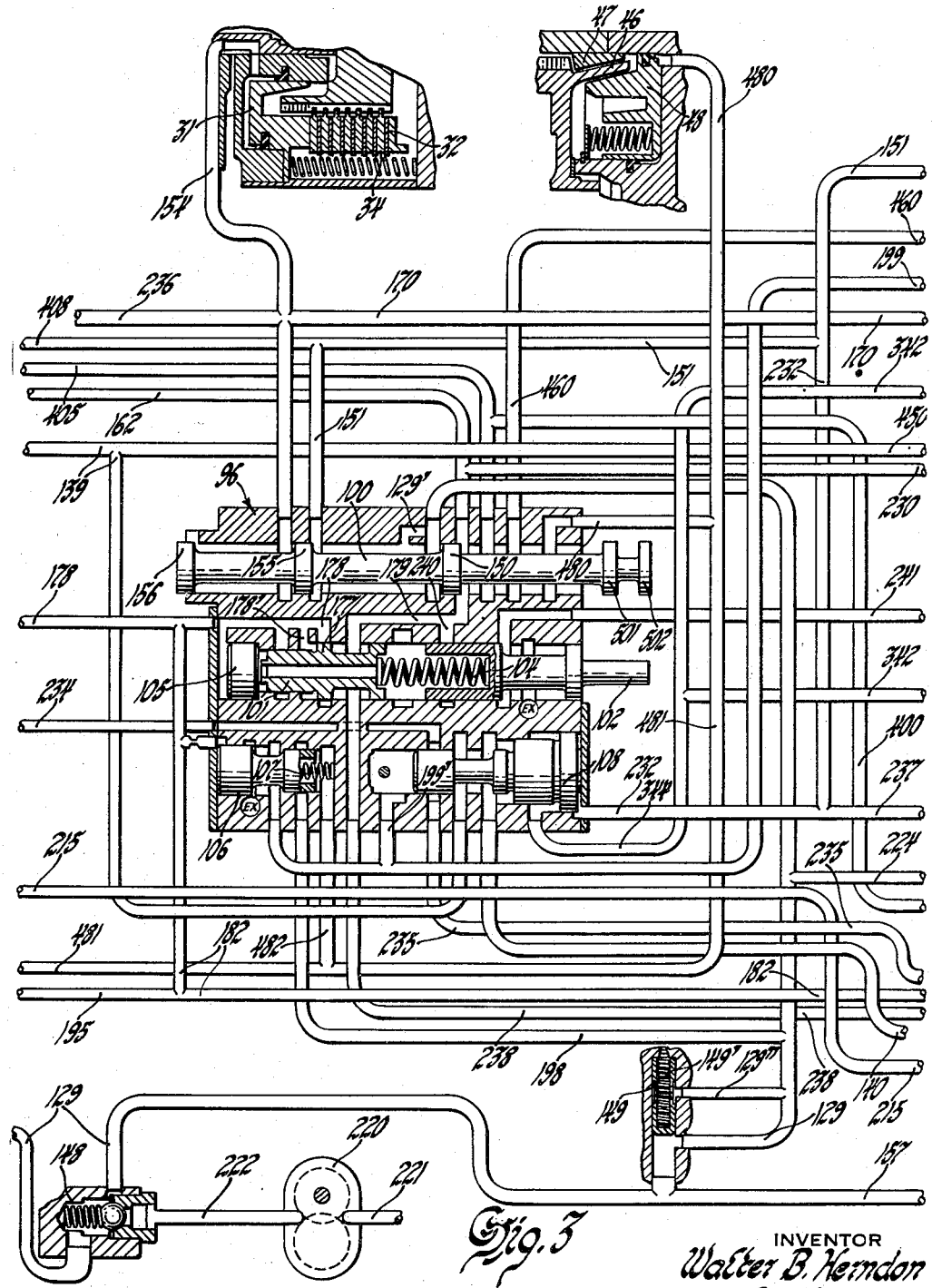
Figure 4:
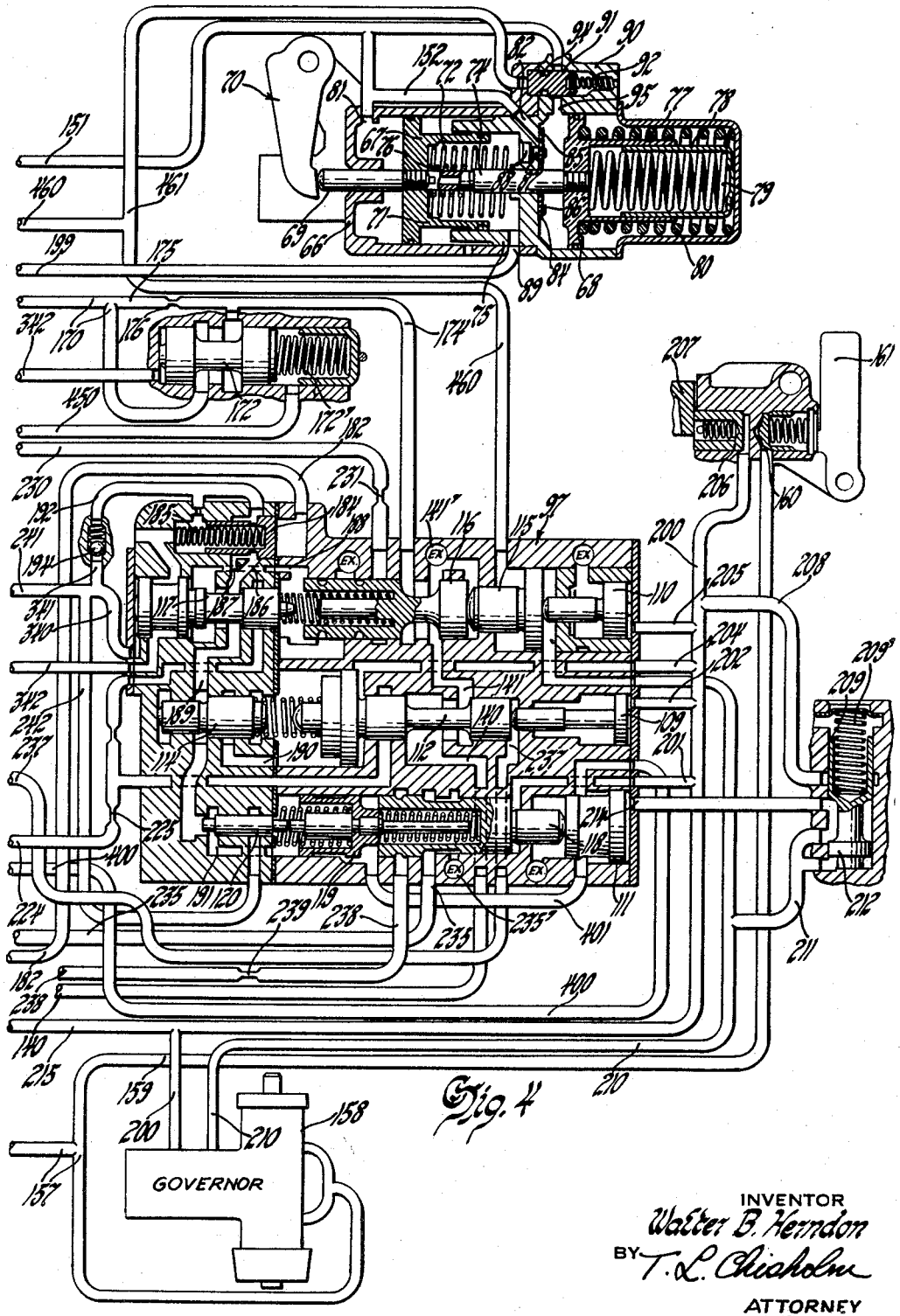

Other features, objects and advantages of the invention will become apparent by reference to the following detailed description of the accompanying drawings, wherein:

Fig. 1 is a vertical section through a part of a transmission embodying the invention, Figs. 2, 3 and 4, when aligned in side-by-side relation, constitute the hydraulic circuit and flow diagram for the transmission with various operating elements thereof shown in fragmentary condition, and Fig. 5 is a view of a modification, such figure being substituted for Fig. 2 in tracing the hydraulic circuits of the modification.

Referring to Fig. 1, 10 indicates generally a flywheel construction driven by a suitable source of power and splined to a shaft 11. This shaft in turn drives a front pump 12 and has an extension connected to the carrier 14 of the front planetary unit, having a sun gear 15 and a ring gear 16 meshing with the planets 14' on carrier 14. The sun gear 15 has splined thereto a disk 17 connected to a drum 18, which in turn is connected to a cylindrical part 19 having splined thereto the impeller 20 of a fluid coupling A. The turbine 21 of this coupling has a cylindrical extension 22 which is splined to an intermediate shaft 24 and also has an extension connecting the cylindrical part 22 with the ring gear 16. Drum 18 has splined thereto brake plates 50, while complementary plates 51 are slidably secured to a part 52 fastened to the casing of the transmission. A piston 54 can be actuated to press these plates together against anchor 51', thereby to lock the drum 18 and, consequently, the pump 20 of the coupling against rotation relative to the transmission casing.

The intermediate shaft 24 is extended to the rear and is connected to, either integrally or in any other suitable fashion, the sun gear 25 of the rear planetary unit which also includes ring gear 26 and carrier 27 having planets 27' meshing with the sun gear 25 and the ring gear 26. The ring gear 26 has connected thereto a drum 28, the periphery of which can be engaged by a band 29 for holding the drum stationary. Drum 28 also has connected thereto a shell 30 within which is slidably mounted a piston 31 to act on clutch plates 32 slidably attached to the drum 28 and additional plates 34 splined to a rotatable block member 35 which is splined to the intermediate shaft 24 so that it must rotate concurrently with the sun gear 25. Actuation of the piston 31 forces the clutch plates 32 and 34 against abutment 36, thereby to lock the sun gear and ring gear for simultaneous rotation. The carrier 27 is connected directly to output shaft 37.

The ring gear 26 has secured thereto a disk 38 which in turn is splined to a sleeve shaft 39 rotatable about the output shaft 37 and having thereon sun gear 40 of the reverse planetary unit. This unit also has as part thereof ring gear 41 and carrier 42 for planets 42' meshing with the sun gear 40 and the ring gear 41. The carrier 42 has a cylindrical extension 44 splined to the output shaft 37 so that the carrier 42 must rotate concurrently with carrier 27. The ring gear 41 has a disklike portion 45 from which extends a cone 46, situated between a fixed member 47 having an inner conical surface and piston 48 having an outer conical surface. When piston 48 is actuated to move to the left, the formation 46 will be gripped between the conical surface of the piston and the cooperating surface of the member 47; and since the latter is fastened to the frame of the transmission, such engagement will lock ring gear 41 against rotation. Springs 49 serve to hold the piston 48 normally out of locking engagement with the ring gear cone member 46.

In Fig. 2 a modification of the front unit has been illustrated. In this figure the disk 17 (Fig. 1), connecting the cylindrical part 18 with the sun gear 15, has been replaced by a shell 17' within which is mounted a piston 60. An annular cone member 61 has projections 62 fitting in recesses in the cylindrical member 18. The outer surface of the ring gear 16 is provided with a conical surface whereby the cone member 61 can be wedged between this ring gear conical surface and the cylindrical member 18 to lock the ring gear 16 to the sun gear 15. It will be noted that the member 61 has a projection which bears against a spring washer member 64, the lower end of which is in contact with a part of piston 60. The outer edge of the washer 64 is held against movement so that, as piston 60 is moved to the right, the spring member 64 is placed under stress to move the wedge member 61 into engagement with parts connected to the two gears. A suitable wave spring 65 is utilized for normally forcing member 61 to the left. This cone clutch is placed in operation only when the transmission is operating in a three-speed driving range, and its operation in this range will be described in detail later.

In neutral the fluid coupling A, Fig. 1, is empty and the disk brake for the front unit having disks 50—51 is disengaged. In the rear unit the band 29 is released, while the clutch for disks 32 and 34 is also released. In the reverse unit the cone brake, made up of parts 46, 47 and 48, is released. Consequently, a lack of continuity of torque transfer through the various units prevents drive of the shaft 37, which may constitute or be connected to the propeller shaft of a vehicle. It is evident that, with the various clutches and the band 29 released, the elements of the respective planetary units are free to rotate at speeds depending entirely on the friction of associated parts.

In first speed the fluid coupling A is filled, while the brake 50—51 is released. This establishes direct drive in the front planetary unit by action of the coupling A so that shaft 24 rotates at substantially the same speed as the shaft 11. The band 29 is applied in the rear planetary unit, which causes ring gear 26 to establish reaction for this unit so that rotation of shaft 24 and sun gear 25 causes rotation of carrier 27 and its pinions at a reduced speed. Since the cone brake in the reverse unit is released in all forward drive ratios, its parts are free to rotate as compelled. Thus in first speed the front unit may operate in direct drive while the rear unit is in reduction drive.

In second speed the coupling A is emptied while the brake 50—51 is engaged, which latter action holds the sun gear and pump 20 of the coupling stationary, establishing reaction through sun gear 15 by which rotation of the carrier 14 and its pinions 14' causes the ring gear 16 and intermediate shaft 24 to rotate at a speed faster than that of the input shaft 11. The rear unit and reverse unit remain in the same condition, just described, so that the overall effect in second speed is overdrive in the front unit and reduction drive in the rear unit. The ratios in the respective units are so chosen that in second speed the output shaft 37 rotates at reduced speed relative to the input shaft 11.

In third speed the coupling A again is filled while the brake 50—51 is released. This establishes direct drive in the front unit through the fluid coupling A. At the same time the band 29 in the rear unit is released while clutch 32—34 thereof is applied, which locks the sun gear 25 and the ring gear 26 together for concurrent rotation, compelling the carrier 27 and its pinions to rotate therewith. Thus direct drive is established in the rear unit and the overall ratio between input shaft 11 and output shaft 37 is 1:1.

In fourth speed the rear unit remains in direct drive, as just described, while the front unit has overdrive established therein by emptying the coupling A and engaging the brake 50—51. In fourth speed therefore the output shaft 37 rotates faster than the input shaft 11.

In reverse drive the front unit is so controlled as to have the elements thereof locked in direct drive by filling of the coupling A and release of brake 50—51. The band 29 of the rear unit and the clutch 32—34 thereof are released while the cone brake of the reverse unit is applied, locking ring gear 41 against rotation. With this ring gear locked against rotation and the output shaft 37 connected to load, it follows that drive of sun gear 25 by the front unit initiates reverse rotation of the output shaft to which both the carriers 27 and 42 are connected. The result is compound reduction in ratio in the rear unit and the reverse unit so that reverse drive is at a considerably reduced speed relative to the input shaft speed.

The manner in which the ratios are established will be discussed in detail in connection with the figures of the drawings constituting the hydraulic circuit diagram for this transmission.

Figs. 2, 3 and 4 together present a circulation and control diagram of the transmission with certain parts thereof being shown in fragmentary form. Other parts thereof will be mentioned briefly and the function thereof described more in detail as the operating sequence is developed.

The servo for applying band 29 to the drum 28 of the rear driving unit is shown in Fig. 4 as being made up of a casing 66 providing two chambers within which are mounted respectively pistons 67 and 68. Piston 67 has secured thereto a rod 69 which extends through one end of the casing to actuate linkage 70, movable when the piston is moved leftwardly of the casing to apply the band about the drum. This linkage is well known in the art and hence is not illustrated or described in detail. Piston 67 has a skirt portion 71, within which is mounted a spring 72, normally forcing the piston to the left. Piston 68 has secured thereto a hollow rod 74 which extends through partition 75 into the space provided by the skirt of piston 67. Spring 76 normally tends to separate rod 74 and piston 67. Piston 68 likewise is provided with a skirt 77, within which is mounted a cup-shape member 78 and spring 79. Spring 80 surrounds the skirt portion of this piston. A port 81 is provided in one of the chambers affording communication with the left side of piston 67. An inclined port 82 extends through the wall of the casing and through partition 75 into communication with the space to the left of piston 68. Port 82 has one end of a reed spring 84 extending thereacross; the reed spring being provided with a restricted opening 85. This spring is of arc shape to fit around the rod 74 so that one end of the spring can be attached to the partition 75 as by a rivet 86. A rod 87 extends through the reed spring near the other end thereof and fits in a suitable opening in the partition wall. This opening is enlarged to receive a piston member 88 which can be forced to the right to flex the reed spring and to move it partially away from the end of the passage 82. Fluid for causing such movement of the spring can be introduced into the interior of the casing through a port 89.

The casing 66 has a two-part enlargement 90 provided with a bore for the reception of a piston 91 biased to the left by spring 92. Member 91 has an annular groove 94 which can be brought into register with a through-passage 95 during a phase of operation of the mechanism, as will be apparent later.

As is customary in transmissions of this type, a manual valve body 96 and a shift valve body 97 are provided, it being understood that while these bodies are shown in separated condition, ordinarily they are superposed one on the other, and some of the passageways shown as constituting conduits in the diagram of the three figures of drawings, are in actuality internal passageways in the two bodies brought into communication one with another. The manual valve body 96 has a manual valve 100 slidable in a bore which has a number of ports connected to fluid lines. This body also has a bore in which is slidably mounted a two-part throttle valve, the parts being shown at 101 and 102 with spring 104 interposed between the parts. A detent plug 105 is located in the same bore. A compensator plug or valve member 106 is located in another bore in the valve body, such member 106 being pressed normally to the left by spring 107. The bore is further hollowed-out for the reception of double transition valve member 108.

The shift valve body 97 is hollowed out for sliding movement of governor plugs 109, 110 and 111. At the end of plug 109 is slidably mounted 1st to 2nd shift valve 112, and beyond that member is regulator plug 114. At the left end of governor plug 110 is mounted the 2nd to 3rd auxiliary valve 115 and beyond that the 2nd to 3rd shift valve 116. A 3rd to 2nd detent plug 117 is mounted to the left of the valve 116. At the left of the plug 111 is the 3rd to 4th shift valve 118 and, consecutively to the left thereof, the 3rd to 4th lockout valve 119 and the 3rd to 4th regulator plug 120. Suitably calibrated springs are associated with the various valve members as are indicated in the drawings. Other types of valves and their action in conjunction with calibrated springs will be described in the detailed description of a complete sequence of operations of the transmissions.

The manual valve 100 has five positions; namely, neutral, driving range 4, driving range 3, low and reverse. Enlargement 501 at one end of the manual valve is spaced from a second enlargement 502 between which can fit a fork connected to a manual shift lever positioned conveniently for the operator of the vehicle. Inasmuch as this arrangement is well known, illustration thereof has been omitted. The neutral position of the manual valve is shown in the drawings, and it will be understood that the other four positions of the valve involve movements to the right sufficiently to uncover consecutively ports in the valve body for the respective positions. The manual valve is customarily placed in the neutral position, i.e., that shown in the drawings, before an attempt is made to start the internal combustion engine or other prime mover associated with the transmission. With the valve in this position, the engine can be started, causing the flywheel assembly 10 to rotate and consequently imparting rotation to the shaft 11, pump 12, and carrier 14. Pump 12 may be of any suitable type but, for purposes of illustration, has been shown to be of the variable capacity type, many of which are familiar to those skilled in the art, but particularly the pump 12 is of the type disclosed in the pending application of Herndon et al., S.N. 153,342, filed April 1, 1950, for Variable Capacity Pump, now abandoned.

*Neutral*

Rotation of the pump 12 supplies liquid under pressure to various parts of the mechanism and also supplies oil for lubrication purposes through the line 125 to the interior of shaft 11 and from this interior passage through the usual oil channels to any desired location in the mechanism. With the engine running in neutral, it is essential that no driving effort be imparted to any part of the transmission, and provision is made for assuring such condition.

In the front driving unit rotation of driving shaft 11 also drives the carrier 14. Since the ring gear 16 and the turbine 21 of the fluid coupling are connected to the intermediate shaft 24, which is disconnected from load in neutral, while pump 20 of the coupling is connected to the sun gear, these two gears and their connected parts may rotate with the carrier. Provision is made for preventing filling of the coupling with liquid in neutral through the agency of two valves mounted for reciprocation in valve body 126. The two valves are indicated generally at 127 and 128. Liquid drawn from the transmission sump through line 12′ by the pump 12 passes through outlet line 129 and branch 130 to a port 131 in the valve body 126 and from this port 131 through internal passage 132 to the bore of valve 128. In neutral position each of the two valves 127 and 128 are spring pressed to their uppermost position by springs 127′ and 128′ respectively. Due to this position, land 134 on valve 128 blocks further passage of the liquid to the coupling fill line 135. Entry of fluid into the coupling from the pump 12 is thereby prevented, while any fluid which might be in the coupling is exhausted through line 136, tapped into the coupling housing and extending to port 137 in the body 126, which port, in neutral, is in communication with the exhaust port 138. Liquid supply line 139 extending to piston 54 of the brake, having plates 50 and 51, is exhausted since this line extends to the double transition valve 108, at which point it is connected to line 140 which extends to the 1st to 2nd shift valve 112 and thence through line 141 to an exhaust outlet 141′. Another liquid supply line 142, connected to the bottom of the bore of valve 128, extends to a port 144 in the bore of a valve body in which valve member 145 is slidably mounted. Port 144 is in communication with port 146 to which is connected line 147 joining line 139. With valve 145 in the position shown, it will be seen that the line 142 is exhausted due to its connection with line 139, the exhaust circuit of which has just been traced.

The rear driving unit is under the control of band 29 and the clutch having plates 32 and 34. The band 29 is under the control of the rear servo, previously described, which servo is spring actuated to apply the band and fluid operated to release the band. Since in neutral the band must be released, supply of fluid for this purpose may be traced in the following manner. Liquid from the pump, continuing in line 129, passes through the ball valve body 148 into the bottom of the exhaust valve casing having valve 149 therein, lifting this valve against spring 149′ so that liquid can continue to a port in the manual valve body immediately to the left of land 150 of manual valve 100. The line 129 at this valve body has a branch 129′ for a purpose to be described later. Oil entering the bore of the manual valve from line 129 can pass therefrom through line 151 to the rear servo to which this line is connected at the port 81 and has a branch line 152 connected to the port 82. Oil under pressure entering these two ports forces the pistons 67 and 68 to the right, retracting the rod 69 into the servo casing to release the band 29. At the same time, any liquid which might be in the clutch casing behind piston 31 is exhausted by line 154 which extends to a port in the manual valve body immediately to the left of land 155 of this valve, from which point the oil is exhausted at the end of the casing adjacent to land 156. With the clutch exhausted and the band 29 released, it is evident that the rear driving unit is in idling condition and can transmit no torque therethrough.

In neutral, as well as in all forward drive ratios, the reverse cone mechanism, composed of parts 46, 47, and 48, is released, due to any fluid which could act on the piston 48 being exhausted through the line 480 which extends to the bore of the manual valve 100 to the right of the land 150 thereof. The end of this bore is open so that liquid entering the same to the right of land 150 is free to return to the sump.

Simultaneously with supply of oil through line 129 as before traced, oil is also supplied through branch line 157 to governor 158 and through another branch line 159 to the piston 160 which, under oil pressure, is moved to the right, forcing the parking pawl 161 out of engagement with teeth on the planet carrier 44 of the reverse planetary unit of the transmission. This construction is well known in this art and hence is not illustrated in detail; it being deemed sufficient to point out that this pawl serves to lock the transmission against adventitious rotation when the engine is not operating, and thereby to aid in holding the vehicle against movement. Oil under pump pressure is also supplied to other lines which will be discussed in the order of use of oil passing therethrough.

*First speed idling, driving range 4*

The operator of the vehicle may determine which driving condition is desired and move the manual valve 100 to the proper position to carry out his decision. It is believed desirable, however, to explain the sequence of operation for the various conditions as would be caused by a normal selection of positions entailing movement of the manual valve at intervals in a direction to the right, Fig. 3, according to the drawings. Therefore let it be assumed that driving range 4 is selected, which means that the transmission is capable of operating through four forward speed ranges. The manual valve 100 is moved to the right sufficiently for the land 150 to completely uncover the port in the valve body connected to oil line 162 which permits oil from pump supply line 129 to enter line 162 through which it travels to the top of the bore of valve 128. This oil has sufficient pressure to force valve 128 to its downmost position, at which time the land 134 thereof will uncover the port connected to the coupling supply line 135. With valve 127 in its upper position due to the spring 127′ oil from line 130 can pass through the valve body 126 to line 135 from which it can enter the coupling at the port in the housing thereof connected to this latter line. This downward movement of valve 128 causes the land 164 thereof to close the port 137 connected to coupling exhaust line 136 so that the oil entering the coupling housing cannot be immediately exhausted therefrom. However, since it is desired that substantially no torque be transmitted by the coupling while the engine is idling, a line 165 connected to a port in the coupling housing extends to a port 166 in the bore of the valve 127 into which land 167 of this valve is partially accommodated. If the pressure built up in the coupling is sufficient for oil exiting from the coupling through line 165 and acting on the top of land 167 to overcome the biasing spring 127′ of this valve, the valve is forced downwardly a distance which will permit oil to escape around the reduced diameter stem 168 and proceed through passage 169 to exhaust at the port 138. Thus, while the engine is idling such pressure will not be established in the fluid coupling as would cause it to transmit torque to drive the turbine 21 and the parts in train therewith.

Movement of the manual valve 100 to this driving range 4 position causes the land 155 to be positioned to the right of the port connected to line 151 while land 156 is completely within the bore of the valve, cutting off the connection of this bore to exhaust at the end of the valve. Since in first speed condition the rear unit must have the band 29 applied to prevent rotation of ring gear 26 and such application is caused by spring action in the servo, the oil used in obtaining the release of the band as described in connection with neutral position must be exhausted from the servo. Thus, with the lands of the manual valve in the new position, it follows that oil in the servo is exhausted through line 152 and line 151 to the manual valve bore, thence through line 154 to its junction with line 170 which extends to the bore of valve 172 and from that bore through line 174 to the bore of 2nd to 3rd shift valve 116 and to exhaust at 141′. It will be noted that a branch line 175 bypasses the valve 172 but, since this branch line has a restriction 176 therein, the oil will naturally follow the most open path to exhaust. At the same time the rear clutch remains exhausted through a part of the line 154 which is connected to the branch line 170 and the circuit just traced. Oil to the left of piston 68 in the servo is exhausted at a slower rate than that to the left of piston 67 due to the small orifice 85 in the reed valve 84. The purpose of this slow release of the oil is to provide a cushion for the spring action of the servo in applying the band since the springs have considerable strength. Application of band 29 to the rear unit locks the ring gear 26 against rotation so that when the sun gear 25 is rotated the carrier 27, whose planets 27′ are in mesh with the sun and ring gears, will be rotated but at a reduced rate of speed. The brake for the front unit, which brake has the piston 54 therein, remains exhausted as described in connection with neutral. Thus it will be seen that the transmission is conditioned for first speed operation as soon as the engine is accelerated.

*Operation in first speed*

When the engine is accelerated by throttle action, throttle valve 102 is moved to the left by a suitable connection to the engine throttle (which connection is not shown), placing spring 104 under additional compression so that throttle regulating valve 101 is also moved to the left, causing the land 177 to partially uncover a port connected with line 178. Oil in the bore of the manual valve can pass through line 179 to the bore of valve 101 and thence through line 178 for distribution throughout the system. The valve 101 acts to regulate the pressure of the oil delivered through the line 178 since, as is customary in this type of construction, a branch 178′ introduces oil from line 178 to the left side of land 177, tending to move it to the right and thereby to close the port connected to line 178. This regulating action is the result of the pressure of spring 104 which permits the so-called throttle valve oil pressure to increase as the throttle is opened.

The immediate effect of the oil under throttle valve pressure is that some thereof is conducted through a continuation of the line 178 to a branch 180 leading to the bottom of the valve casing enclosing valve 127. This oil can act on spool valve member 181, tending to raise it and consequently the valve 127 against coupling pressure from the coupling housing through line 165. Higher coupling pressure is required to move the valve 127 to exhaust position and hence it follows that the coupling pressure rises so that driving effort can be transmitted from the pump 20 to the turbine 21. This turbine is connected through the intermediate shaft 24 to the sun gear 25 of the rear driving unit and through this rear unit to the output shaft 37 which in all probability constitutes the propeller shaft of the vehicle. With the vehicle at rest the turbine is in effect connected to the road wheels so that it offers considerable resistance to rotation, thereby providing in the ring gear attached to the turbine the necessary reaction for causing the sun gear 15 and consequently the pump 20 to rotate at a higher speed than the speed of rotation of the carrier 14. As soon as the pressure of oil in the coupling has increased sufficiently and the speed of rotation of the pump has also increased, the coupling action of the fluid coupling will take place, causing the turbine to rotate and likewise those parts of the mechanism in train therewith. The difference in relative rates of rotation between the pump and the turbine will decrease until these rates are in as close synchronism as is possible with a particular fluid coupling. When such condition occurs the sun gear and the ring gear will be rotating almost in unison so that in actuality they will be rotating with the carrier and hence the front driving unit will be driving in direct drive while the rear unit is in reduction drive.

Oil under throttle valve pressure, in addition to the last described distribution thereof, also is introduced from line 178 to the left of the detent plug 105 and through a branch from line 182 to the left of the compensator plug 106 and further through line 182 to the throttle valve regulator plug 184. This plug is forced to the right by calibrated spring 185 of such strength that oil under a predetermined pressure is required to move the plug to the left. When this oil is present the plug is moved to the left, uncovering the port connected to the inclined passage 186 which in turn leads to the bore in which a part of plug 117 can slide. A bypass 187 permits some of the oil to be returned to act against the differential area on the left side of the plug, tending to augment the spring 185 and to close this plug. The plug therefore acts to regulate the pressure of oil delivered to the bore of valve 117 from which it can pass through channel 188 to the left end of the 2nd to 3rd shift valve 116. This oil under pressure serves to augment the spring associated with the shift valve in forcing this valve to the right. The regulated or modulated pressure oil also passes through channel 189 to act on plug 114, moving it to the right to uncover the port connected with passage 190 leading to the left-hand end of the 1st to 2nd shift valve 112. This modulated oil pressure serves the same function in augmenting the spring associated with the shift valve. Channel 189 is continued to the left-hand end of plug 120 and the oil therein forces this plug to the right, uncovering the port leading to channel 191 which extends in such fashion as to permit the oil under modulated pressure to act against the left-hand end of the 3rd to 4th lockout valve 119 and through it on the 3rd to 4th shift valve 118. The use of modulated throttle valve oil pressure in connection with various regulator plugs and the like associated with the shift valve is for the purpose of adding to the spring action in each case for determining accurately the time at which a change or shift in transmission operation takes place. It will be noted that a channel 192 is connected to ports in the bore of the plug 184 but that this channel 192 leads to a ball valve chamber in which the ball 194 prevents oil from continuing beyond the valve. The purpose of this valve will be described later.

Oil under throttle valve pressure is also supplied through the branch line 195 from line 182 to one of the regulating valves in the pump 12 for acting on this pump in such fashion as to cause it to deliver oil in such quantity that the desired pressure will be maintained at various points in the mechanism. The line 178, before mentioned, is extended to the top of valve body 196 at which point it acts on the valve 197 to force it, and consequently valve 145, downwardly.

The oil under throttle valve pressure supplied by a short branch from line 182, acting on compensator plug 106, moves this plug to the right against spring 107 until the smaller part of the plug opens the port connected to line 198 which in turn is connected to the pump supply line 129. Oil under pump pressure therefore is permitted to enter the bore of the compensator valve and to leave the same through the line 199 which extends to the port 89 of the servo 66. The oil introduced through this line and port enters the interior of the skirt of piston 67 to force this piston to the left and also passes through the hollow rod 74 into the interior of the skirt 77 of piston 68 so that it can act to force this piston also to the left. This oil under so-called compensator pressure acts to augment spring action in the servo so that as the mechanism is accelerated the springs are assisted in maintaining the band 29 in applied position. Compensator pressure oil therefore permits the use of springs in the servo of less strength than the maximum requirements to be met.

The governor 158 is driven by the output shaft 37 in the usual fashion and the governor itself is of conventional form and construction in that it includes two regulating valves which permit the passage through the governor of oil to be delivered for work under pressure, depending upon the speed of rotation of the governor. A governor of this type is illustrated and described in the patent to Thompson, No. 2,204,872, issued June 18, 1940, for Change Speed Gearing and Control. One valve thereof has a larger weight to be acted on by centrifugal force than the other, so that pressure of the oil permitted by this valve increases more rapidly than the pressure of the valve having a lighter weight attached thereto. It will be noted that the supply line 157 from the pump is branched to the two parts of the governor so that oil under G1 pressure, i.e., pressure from the valve having the heavy weight, can leave the governor independently of oil under G2 pressure, i.e., pressure from the valve having the light weight. Delivery line 200, having oil under G1 pressure therein, is extended to the shift valve body at which point a branch line 201 leads to the large end of the 3rd to 4th shift valve 118. Another branch line 202 leads to the large end of plug 109 while a third branch line 204 leads to the large end of shift valve 112. A further branch line 205 leads to the plug 110. Line 200 is extended to the reverse blocker piston 206 which, when the oil reaches sufficient pressure, will move to the left, causing the blocker mechanism indicated fragmentarily at 207 to engage the control selector mechanism in such fashion as to prevent it from being moved to reverse position. The spring associated with the piston 206 is so calibrated that when the vehicle speed reaches, say, six miles an hour, the oil under G1 pressure will be such as to move the piston against spring resistance. A further branch line 208 from line 200 leads to a port in the bore of 3rd to 4th over-control valve 209 at which point it is arrested.

Oil under G2 pressure from the governor is directed by line 210 to the large end of plug 115. A branch line 211 leads to the lower end of the valve 209 at which point the oil enters this valve in divided channels, one directing it to the lower end of the land 212 and one directing it to the space between land 212 and the valve body 209. From this bore line 214 extends to the end of plug 111. The function of the oil under G2 pressure afforded by the governor will be clear from a later description of operation of the shift valves and their associated parts. However, while the transmission is operating in first speed, oil under G1 pressure through line 215 from main 200 extends to the bore of the valve 127 where it can act on the lower end of this valve to assist the spring which normally forces the valve upwardly. Thus, while acceleration in first speed is being accomplished, oil under throttle valve pressure and under G1 pressure acts to prevent downward movement of valve 127 due to the pressure of the oil in the fluid coupling. Valve 127 therefore acts as a regulating valve for determining the working pressure of the oil in the coupling in accordance with vehicle speed and torque demand; the vehicle speed being represented by oil under G1 pressure and the torque demand by the oil under throttle valve pressure. In other words, if the load is relatively light, a lower oil pressure and consequently a softer coupling action will produce the necessary results; while if the load is higher, the pressure must be increased in the coupling to assure the necessary transmission of torque thereby.

The rear pump 220, which may be of any suitable type, is also driven by the drive shaft 37; and this pump, which draws oil through line 221 from the sump (not shown), delivers the oil through line 222 to the ball valve casing 148. When the drive shaft reaches a speed to drive the pump 220 at a fairly high rate, this pump may deliver oil under such pressure as to unseat the ball in valve 148, at which time the rear pump aids the front pump in supplying oil to various parts of the system and, in fact in some phases of operation of the mechanism, the rear pump may take over the task of supplying oil to the entire system, more or less deactivating the front pump 12 by supplying oil under pressure to the output of the pump 12.

The action taking place in the front unit during idling in first gear ratio and in initial drive in that ratio is of considerable importance and warrants some repetition. When the transmission is conditioned for first gear drive, the rear unit has the band 29 applied, with the direct drive clutch released. Such condition immediately connects the intermediate shaft 24 through the rear unit with the output shaft 37 so that when the vehicle is at rest rotation of shaft 24 is opposed by the inertia of the vehicle. Since the turbine 21 of the coupling A and the ring gear 16 are connected to the intermediate shaft 24, which is stationary as just explained, the ring gear offers reaction in the front unit so that rotation of the carrier 14 by the input shaft 11 immediately causes rotation of the sun gear 15 at an overdrive rate relative to the carrier. The pump 20 is driven directly by the sun gear 15 so that the pump immediately rotates at a speed faster than the speed of the input shaft 11.

As before explained, liquid is admitted to the coupling A when first gear ratio is selected so that, if the coupling were permitted to become filled with liquid under pressure, the turbine 21 would almost instantaneously be driven by the pump to cause rotation of the intermediate shaft. However, when the engine is idling and motion of the vehicle is not desired, such action is prevented, thereby preventing the so-called "creep" of the vehicle. This is accomplished by the pressure regulating valve 127. At idling, throttle valve pressure is not present at the bottom of the plug 181 and, since the vehicle is stationary, G1 pressure is also not present against the lower end of the valve 127. Consequently, the only force holding this valve upwardly is that of spring 127' so that, as pressure begins to build up in the coupling A, liquid can depart therefrom through the line 165 to the port 166 and act on an upper surface of the valve 127 to move it downwardly sufficiently to cause this liquid to be exhausted around the stem part 168, passage 169, and to exhaust at the port 138. The spring 127' is so calibrated that a build-up of pressure in the coupling sufficiently to cause drive of the turbine thereof is prevented in the absence of either or both throttle valve pressure and G1 pressure. So long as the throttle is retarded, "creep" of the vehicle is prevented.

When the throttle is advanced, throttle pressure is immediately developed and delivered to the lower end of plug 181, causing it to move upwardly in aid of spring 127', thereby establishing greater resistance to the exhaust of liquid from the coupling so that working pressure therein can rise, resulting in drive of turbine 21. Such drive is imparted to the intermediate shaft 24 and through the rear planetary unit to the output shaft 37. As the speed of the turbine increases relative to the pump, the reaction established by the ring gear changes on a sliding scale so that the speed of rotation of the ring gear and the pump relative to the carrier 14 decreases, and such change in relative speeds of the two elements of the coupling continues until they are rotating as closely in unison as the design and characteristics of the coupling will permit. When such occurs, the elements of the front unit are rotating substantially as a unit so that for all practical purposes it may be said that this planetary unit is in direct drive condition.

As the vehicle speed increases the G1 pressure supplied to the lower end of the regulating valve 127 also increases, adding a force to move the valve 127 upwardly and in turn increasing the pressure in the coupling which is required to move this valve downwardly and permit exhaust of the coupling fluid. Therefore it will be evident that, depending on throttle position indicative of torque demand and the speed of the vehicle, the action of the coupling can be either "soft" or "hard."

To summarize the condition that prevails in first speed, it will be seen that the front unit operates in direct drive with the fluid coupling functioning to initiate the transfer of torque between the pump and turbine thereof and for associated gear elements, eventually causing these elements to rotate practically in unison with the input element, i.e., the planet carrier. The front unit therefore is operating in direct drive while the rear unit operates in reduction drive due to the band 29 restraining drum 28 and ring gear 26 against rotation, with the sun gear 25 serving as the input element and the carrier 27 serving as the output element and connected directly to the output shaft 37. Thus one ratio of reduction drive is accomplished.

The transmission will continue to drive in first speed condition until the speed of the vehicle in relation to torque demand reaches such a point that provision is made for automatically shifting into second speed.

*Shift 1st to 2nd*

When the vehicle speed has increased to such an extent that G1 pressure from the governor applied to the plug 109 (line 200 and branch 202) and to the 1st to 2nd shift valve 112 (line 200 and branch 204) is high enough to overcome the spring acting against the valve and throttle valve pressure also acting against the valve, the plug 109 and also valve 112 will be moved to the left until the port connected to channel 141 is closed and a port connected to line 224 is opened. This line is in communication with pump supply line 129 through a restriction 225. When the port connected to line 224 is opened oil under pump pressure flows through this line, through the bore of the shift valve and therefrom through line 140 to the bore of the compensator valve 108 and thence through line 139 to the piston 54 of the front unit brake. As soon as pressure is built up behind this piston, oil from the same line flows through a branch 226 to the bottom of cylindrical valve 227 forcing this valve upwardly and also forcing valve 145 upwardly (if it had been depressed) against throttle pressure at the top of valve 197, assuring that valve 145 will place the ports 144 and 146 in communication. When such communication has been accomplished oil from the line 139 flows through the branch 147 around valve 145 and through line 142 to the bottom of the housing for valve 128. Entry of oil into this housing balances the oil under pressure supplied to the top of the valve so that this valve will be moved upwardly under spring pressure to its full uppermost position. At that time the exhaust line 136 of the fluid coupling is connected through the port 137 and the bore of valve 128 to exhaust at the opening 138. The timing valve, made up of members 227, 145 and 197, acts to assure that the front unit brake will be fully engaged before oil is exhausted from the fluid coupling so that the engine will never be disconnected from the transmission. When the plates 50 and 51 of the front unit brake are fully engaged by action of piston 54, sun gear 15 will be locked to ground and held against rotation. As soon as this occurs continued rotation of the carrier 14 will cause rotation of the ring gear 16 at an increased rate of speed and, consequently, rotation of the pump 21 and intermediate shaft 24. This action effectively places the front unit in overdrive and, since the presence of fluid in the coupling would produce no useful results but in fact would be harmful, the provision for exhausting fluid from the coupling is made. Thus the turbine 21 can rotate while the pump 20 is held against rotation without creating turbulence or heating as would be the case if the coupling were filled.

The rear unit is maintained in its reduction drive condition established when the manual valve was first moved to driving range 4 position so that the mechanism is still transmitting torque therethrough but at a reduction which varies from that of first speed due to the fact that the front unit is now operating in overdrive instead of direct drive.

*Shift 2nd to 3rd*

When the vehicle has attained a predetermined speed in relation to torque demand, liquid under pressure from the governor is supplied at two positions in the shift valve mechanism for shifting from 2nd to 3rd speed. It will be apparent that oil under G1 pressure acting on plug 110 (line 200 and branch 205) and oil under G2 pressure (line 210) acting on plug 115, when sufficiently high, can move these plugs to the left thereby moving the 2nd to 3rd shift valve to the left until the port connected to exhaust 141' is closed and the port connected to line 174 is placed in communication with a port connected to line 230 which extends to the line 162 to receive liquid under pump pressure therefrom. A restriction 231 acts to limit flow of fluid through line 230. At this time fluid from the manual valve body is supplied through line 230, through the bore of 2nd to 3rd shift valve 116, to the line 174, past valve 172 to line 170, and line 154 to the piston 31 of the rear unit clutch. Simultaneously oil travels through the extension of line 154 to the manual valve body and from it through line 151 to the servo for the rear unit and also through the branch 152 for the second piston of that unit.

The simultaneous application of oil to the piston 31 of the rear unit clutch and to the servo causes engagement of clutch plates 32 and 34 to lock sun gear 25 to ring gear 26 and at the same time to release band 29 in the manner described in connection with neutral. This changes the condition of the rear driving unit from reduction drive to direct drive since, with the sun and ring gears locked together, rotation of the sun gear causes rotation of all parts of the unit simultaneously and at the same rate. Consequently, since the carrier 27 is rotated in this uniform rate, it follows that the output shaft 37 likewise is so rotated.

However, to prevent an unduly large ratio change, it is desirable that the front unit be conditioned for direct drive instead of overdrive. A branch line 232 from line 151 feeds oil to the large end of the double transition valve 108, moving it to the left against oil under compensator pressure supplied by branch 199' of line 199. This movement of the double transition valve closes the port connected to line 140 which has supplied oil to actuate the front unit in second speed and, at the same time, establishes a new connection for exhausting oil from that unit. Thus oil supplied to the bottom of the valve casing for coupling control valve 128 is exhausted through the line 142 to port 144 at valve 145 and from that port to the port connected to line 234 leading to the double transition valve 108 and continued through line 235 to the bore of 3rd to 4th shift valve 118 and to exhaust at 235'. The passage from line 142 to line 234 is made possible by the valve 145 having been moved to its downmost position due to the application of oil through line 236 branched from line 154 and extending to the top of valve 145. Also, the oil which had actuated the front unit ground brake is exhausted from the casing of piston 54 through line 139 to the double transition valve 108, through the bore thereof to the line 235 and then to exhaust in the manner just described. When pressure is relieved from the lower end of valve 128 it is immediately forced downwardly by pump pressure being constantly supplied to the top thereof through line 162 as before pointed out. Consequently, the supply of oil to the fluid coupling is reestablished so that the front unit functions in the same manner as in first speed condition. Thus a double transition is accomplished in that the front unit is changed from overdrive to direct drive while the rear unit is changed from reduction drive to direct drive. The end result is that in third speed the transmission operates to transmit torque directly from the engine to the output shaft without the interposition of reduction gearing. At the same time that oil is being supplied to operate the double transition valve through line 232, it is also being supplied through branch line 237 from line 232 to the right-hand end of the 1st to 2nd shift valve 112, adding to the force holding this valve to the left and assuring that the mechanism is incapable of shifting from 2nd to 1st during the period required for the double transition necessary in shifting from 2nd to 3rd.

*Shift 3rd to 4th*

After the vehicle has operated with the transmission in third speed for a predetermined period of time, depending on the relation between torque demand and vehicle speed, oil supplied from the two halves of the governor will develop pressure on the plug 111 (G2 pressure through line 210, branch 211 and line 214) and on the 3rd to 4th shift valve 118 (G1 pressure through line 200 and branch 201) sufficiently high to move these parts to the left. This movement of the shift valve 118 places the line 235 in communication with line 238 having restriction 239 therein which receives oil under pump pressure from the line 179 at the bore of throttle valve 101. This oil under pump pressure, therefore, circulates in this fashion through the line 235 to the double transition valve at which point it progresses by two paths to the front unit. The oil passing from the double transition valve through line 234 reaches the bore of valve 145 and continues therefrom through line 142 to the bottom of valve 128, balancing pressure supplied to the top of the valve and permitting this valve to move to its full upward position under spring pressure. Oil in the fluid coupling is then exhausted therefrom as described in connection with second speed. The second path of oil from the double transition valve extends through line 139 to piston 54 of the front unit brake, causing the plates 50 and 51 to be engaged, thereby locking the sun gear against rotation. The action at the front unit is so timed that the ground brake is fully engaged before oil is exhausted from the coupling so that the engine is maintained under load.

The condition of the rear driving unit is unchanged at this time, i.e., it remains in direct drive while the front unit now operates in overdrive as fully described in connection with second speed. Thus the transmission of power from the engine is at an increased rate due to the overdrive condition in the front unit so that the output shaft 37 rotates at a higher speed than the input shaft 11 and the flywheel 10.

Operation in fourth speed can continue so long as the vehicle speed and torque demand, as represented by the throttle opening, are in a relation fitted for fourth speed operation. Should the speed of the vehicle decrease so that governor pressure drops, it will be evident that the 3rd to 4th valving cannot be maintained in fourth speed condition, in which event this valving will be moved to the right, reestablishing third speed operating conditions. Likewise, further deceleration of the vehicle will result in progressive downshifting establishing second speed and finally first speed conditions.

*Forced 4th to 3rd downshift*

Under some operating conditions it may be desirable to obtain increased transmission of torque and, consequently, acceleration of the vehicle at a higher rate than is afforded during operation in fourth speed. Therefore, provision is made for obtaining a forced shift from 4th to 3rd speed provided the vehicle speed is below a certain maximum permitted for this purpose. Such a shift can be obtained by moving the throttle valve 102 to the left until it contacts directly with the valve part 101 and forces this part 101 against the resistance offered by the detent plug 105. Such a movement of the throttle valve to the left opens a port connected by line 240 to pressure line 179 and places this line in communication with a line 241. Oil from line 179 can pass through line 240 into the bore of the throttle valve and therefrom through line 241 to a branch line 242 which extends to the bore of the 3rd to 4th regulator plug 120. In fourth speed operation this plug had been moved to its extreme left-hand position uncovering the port connected to line 242 so that oil therefrom can pass through the bore of the regulator plug body and into contact with the left-hand end of lockout valve 119, moving it and shift valve 120 to the right. The oil so supplied is under full pump pressure so that it can move the valve 118 to the right against oil under governor pressure, reestablishing third speed operating conditions.

With the throttle moved to full position and with the detent plug 105 moved to the left for establishing forced downshift from fourth to third gear ratios, drive will continue in this latter ratio so long as the throttle is depressed until an engine speed is approached which, if sustained, might prove injurious to the engine. For example, it may be inadvisable to operate the vehicle at a speed in excess of 75 m.p.h. in third gear ratio, and to prevent operation above that speed the over-control valve 209 is provided. Referring to Fig. 4 of the drawing, it will be seen that G2 pressure is applied both to the lower surface of land 212 and to the reduced spindle zone between this land and the valve 209. Spring 209' is calibrated to hold the valve 209 in the position shown until the vehicle attains a speed approximating 75 m.p.h., at which time G2 pressure, acting on the lower surface of land 212, will be high enough to raise the valve 209 against spring 209', thereby placing line 208 in communication with line 214. At this vehicle speed G1 pressure, which is present in line 208, is substantially pump pressure so that when this oil is supplied through line 214 to the righthand end of governor plug 111, its pressure is high enough to force this plug to the left, carrying the 3rd to 4th shift valve 118 with it. Fourth speed ratio is thereby established, even though pressure is present opposing such an action, such pressure having been established between detent induced downshift. This over-control valve 209 therefore acts to overrule the selection of third speed ratio and to force an upshift into fourth speed when vehicle speed renders the same necessary.

*Driving range 3*

A second range of operation is provided in this mechanism, which range under normal driving conditions limits the mechanism to operation in first, second and third ratios.

To select driving range 3 the manual valve 100 is moved to the right sufficiently to uncover a port connected to line 400 which extends to the bore of the governor plug 111, to be effective upon the left surface of the larger land thereof. From this bore the oil supplied from the manual valve continues through line 401 to the left end of the 3rd to 4th shift valve 118. Since the oil so supplied to the governor plug 111 and the shift valve 118 is at pump pressure, it follows that under normal operating conditions governor pressure will not be high enough to cause a 3rd to 4th shift in the manner described previously. Consequently, the mechanism will automatically progress through first and second ratios to third ratio and will remain in third until a vehicle speed is reached which requires a shift to fourth speed to protect the engine. This latter shift is accomplished by the over-control valve 209 in exactly the same fashion as described in connection with the forced 4th to 3rd downshift.

The just described action in the selection of driving range 3 would suffice for the apparatus shown in Fig. 1, but provision is made for obtaining engine braking by the arrangement shown in Fig. 2. In this figure the lockup clutch having cone 61 can be operated to lock the sun gear 15 and the ring gear 16 together so that the action of the fluid coupling is effectively by-passed and the front unit is in true direct drive condition.

This lockup maneuver is the result of the following sequence of events. Referring again to the manual valve 100, it will be seen that the line 400 has a branch line 405 which extends to the top of lockup control valve 406. This oil will force valve 406 downwardly against spring 407 and place branch line 408 connected to line 151 in communication with line 409 which extends to a bore 410 of the delayed relay valve indicated generally at 411. The relay valve has a piston-like member 412 slidable in a bore 413 larger than the bore 410 and normally forced downwardly by spring 414. Connected to the piston 412 is a stem 415 of size to fit in the bore 410 and thereby to cut off line 409 from that bore.

The bore 413 is supplied with oil from the fluid coupling A by line 416 extending to body 417, within which is mounted a ball check member 418 pressed upwardly by spring 419. A restricted passage 420 extends from the body 417 to the bore 413, while another passage 421 extends from the ball seat to the bore 413. An oil line 422 extends from the bottom of bore 410 to the casing 17', entering the same in position to act on the clutch piston 60.

If the fluid coupling A is filled, liquid therefrom passes through the line 416 to the body 417 and from this body through the restricted passage 420 into the bore 413 to lift the piston 412 and its attached stem 415. The ball 418 effectively prevents passage of liquid through the larger passage 421 and compels any liquid entering the bore 413 to pass through the restriction. This results in a measured slow opening of the line 409 to the bore 410. Since the coupling is filled in first and third speed ratios, it is obvious that the delayed relay valve 411 will be operated in each of these ratios. However, opening of the line 409 to the bore 410 is ineffective in the driving range 4 operation since the valve 406 closes the bore connected to line 408, and line 409 is connected to exhaust at 409'. In driving range 3 oil is supplied through line 405 to the top of valve 406, moving it downwardly to establish connection between lines 408 and 409. This connection, however, has no effect on the operation of the mechanism in first speed since fluid is supplied to line 408 only when third speed ratio is established.

When the transmission advances automatically to third speed ratio oil is supplied to the parts, as described previously, with the result that liquid under pressure reaches the rear servo to release the band 29, and simultaneously liquid is supplied to engage the rear clutch through the line 154. In tracing the oil supply it will be seen that the line 408, which is branched from line 151, will be filled with oil which can pass into line 409, the bore 410 of delayed relay valve 411 and line 422 to the piston 60 to engage lockup clutch having cone 61 therein.

The purpose of the delayed relay valve is to insure that the pump and turbine have time to reach full drive condition with their relative speeds as nearly equal as is possible with a fluid coupling. In other words, the lockup control valve being activated still cannot supply liquid to the piston 60 until the valve 411 has operated by movement of piston 412 and stem 415 upwardly a distance sufficient to clear the port connected to line 409. The restriction 420 is sized to obtain the desired delay in this action. The ball 418, while compelling liquid to enter the bore 413 through the restriction, can be moved downwardly against spring 419 to exhaust the bore 413 rapidly when such action is called for.

When the piston 60 is moved to the right, engaging the clutch cone 61 with the ring gear 16 and the part 18 connected to sun gear 15, these two gears are effectively locked together and will rotate in unison with the carrier 14, due to such locking of parts. Should the shaft 24 tend to overrun as would be involved in coasting of the vehicle, locked parts assure that the engine will provide braking for the entire transmission unit and hence the driving wheels of the vehicle.

While the immediately preceding description has been devoted to operation of the mechanism in driving range 3, under the assumption that this range was selected while the transmission was in neutral, the range can be selected at any point in operation of the transmission up to a predetermined maximum speed in fourth gear. Below such maximum speed and with the transmission operating in fourth gear, the manual valve can be moved to the driving range 3 position, whereupon the oil delivered in lines 400 and 401 will cause the 3rd to 4th shift valve to be moved to a position disestablishing fourth speed ratio and re-establishing third speed ratio. Simultaneously, oil passing through line 405 will condition the lockup control valve to apply the lockup clutch actuated by piston 60, as soon as permitted by the delayed relay valve 411.

As before mentioned, the vehicle can be operated in third speed in driving range 3 until the critical speed is reached, at which point the over-control valve 209 will operate in the manner described in connection with the forced 4th to 3rd downshift to cause a shift from third speed ratio to fourth speed ratio. When this occurs and oil is supplied from the 3rd to 4th shift valve 118 through the lines 238, 235, bore of the double transition valve 108 and line 234 to the front unit, a part of the oil passes into the branch 234′ to act on the bottom of valve 406, forcing it upwardly and cutting off oil supplied to the line 409 and connecting that line to exhaust. This exhausts the lockup clutch with spring 64 therein returning the piston 60 to its normal position. In this manner overdrive again is permitted in the front unit, which is essential for fourth speed ratio operation.

3rd to 2nd forced downshift

When the transmission is operating in third speed ratio in either driving range 4 or driving range 3 at particular car speeds, it is possible to compel a shift from third gear to second gear. This is accomplished by movement of the throttle to full open position which again moves the detent plug to the left and places the line 240 in communication with line 241 at the throttle valve in the same manner as accomplished in a forced 4th to 3rd downshift. It will be noted that the line 241, from which line 242 previously described is branched, extends into the shift valve body with two branches, one numbered 340 and the other 341. Oil entering the body through line 340 impinges on the left end of the 3rd to 2nd detent plug 117, moving it to the right in the effort to move the 2nd to 3rd shift valve 116 to the right. At the same time oil in the branch 341 unseats ball 194 and passes through line 192 into the bore of the valve 184 and from it through passage 186 into the bore of the plug 117. This oil can continue through the passage 188 to act on the left end of the 2nd to 3rd shift valve 116 so that the combined pressures acting on the plug 117 and the valve 116 will move the train of elements to the right, disestablishing third speed ratio and re-establishing second speed ratio.

In order that a smooth 3rd to 2nd downshift, which involves changing from direct to overdrive in the front unit and a change from direct drive to reduction drive in the rear unit, an additional valve 172 which may be called a 3rd to 2nd timing valve is employed. When the plug 117 is moved to the right the oil from line 340 is permitted to pass from the bore of this plug through the line 342 to contact the left end of the valve 172, moving it to the right against spring 172′. At the same time a branch line 344 from line 342 supplies oil to the inner surface of the double transition valve 108, acting to move it to the right against the pressure supplied by line 232 which established third speed operation.

When the 2nd to 3rd shift valve 116 is moved to the right, line 174 is connected to exhaust at 141′. However, valve 172, having been moved to the right, communication between lines 170 and 174 is cut so that the oil utilized to actuate the mechanism for third speed operation must be exhausted through the restriction 176 and bypass 175 connected to the line 174. Consequently, the oil utilized in the rear servo for releasing the band 29 is exhausted at a retarded rate and all other lines connected to line 170, such as that actuating the rear clutch, are also so exhausted. This permits a time delay in applying the rear band 29, which permits the front unit to change from direct to overdrive by the supply line established by the 1st to 2nd shift valve 112. A part of this line comprises the line 139 extending from the double transition valve 108 to cause emptying of the fluid coupling A and engagement of the ground brake by action of piston 54. The timed relation between these events was described in detail in connection with the 1st to 2nd shift and it is believed that a repetition is unnecessary. It should be noted, however, that a line 450 extends from line 139 to the bore of valve 172 to the right of the end thereof. As overdrive is established in the front unit, the pressure required for such establishment will gradually rise until it is reflected in the line 450, whereupon the fluid in this line will aid the spring 172′ in moving the valve 172 to the left. When this occurs, any oil remaining in the line 170 will have an open path to exhaust, completing the ratio change in the rear unit. Thus the valve 172 and its fluid connections serve to time the change of ratio in the rear unit to the completion of the change of ratio in the front unit, insuring a smooth downshift from third speed ratio to second speed ratio.

Low range

The manual valve 100 may be moved further to the right to cause the land 150 to clear a port connected to line 460. This places line 460 in communication with the pump supply line 129 so that oil under pump pressure can proceed to the left of the 2nd to 3rd auxiliary plug 115, forcing this plug to the right with such pressure that it cannot be moved to the left by governor pressure resulting from normal second speed operation. The result of such movement is that spring pressure, acting on 2nd to 3rd shift valve 116 combined with modulated throttle valve pressure thereon, will serve to retain this shift valve in the position shown, and it cannot be moved to the left to accomplish a shift to third speed. At the same time oil from line 460 may proceed through branch 461 to the left end of the exhaust valve 91, moving it to the right to align the groove 94 with the passage 95. Assuming that the transmission is in neutral position, oil will have been supplied to move the two pistons 67 and 68 to the right to release band 29. When this oil in line 461 moves the exhaust valve, it expedites exhaust of oil which has been acting on the piston 68 so that the band 29 can be applied more rapidly. This is of particular value when a shift is made from reverse to low, as in rocking the car in mud, sand or snow.

Since the 2nd to 3rd shift valve 116 is precluded from operating, it follows that the transmission advances from neutral to first and then to second ratios in the manner previously described, but that further advance is prohibited, unless an unduly high speed is reached, whereupon governor pressure will compel a 2nd to 3rd shift.

Manual selection of low range may be made during operation of the transmission in any ratio thereof within a predetermined speed of the vehicle, and the change may be made from driving range 4 or driving range 3. Should the change be made from driving range 4, it is certain that movement of the manual valve to the low position will cause a downshift from fourth speed ratio to third speed ratio if the transmission is operating in fourth speed ratio, since the port connected to line 400 must be opened before the port connected to line 460 is opened. Also, should the vehicle be operating with the transmission in third speed and the manual shift to low be made, the oil supplied through line 460 will counteract governor pressure acting on the plugs 110 and 115 and will permit spring pressure and modulated throttle valve pressure to shift the valve 116 from its third speed establishing position.

Reverse

For reverse, the manual valve 100 is moved to the right far enough for land 150 thereof to clear the port connected to line 480, placing this line in communication with the pump supply line 129. Land 155 of the manual valve will be positioned between the ports connected to lines 129 and 129', while land 156 will be positioned between the ports connected to lines 151 and 154.

With the manual valve so positioned, oil in line 480 proceeds to the reverse unit cone brake to act on piston 48, locking the cone 46 to the grounded member 47. Oil from line 481, branched from line 480, extends to the control valve for the pump 12 for the purpose of increasing the pressure output of the pump to approximately double the pressure ordinarily used for forward drive. A branch line 182 from line 481 extends to the right end of the compensator valve 106, forcing this valve to the left and closing the port connected to pump supply line 198. Closing of this line exhausts line 199 which has been arranged to supply compensator pressure to the rear servo to aid in holding the band 29 engaged. At the same time the branch line 199', extending to the left end of the double transition valve 108, is also exhausted for a purpose to be described shortly.

The front unit is conditioned for direct drive by oil supplied through line 162 to the top of the fill control valve 128, forcing this valve downwardly and permitting the coupling A to be filled in the manner previously described. The rear unit is conditioned for reverse drive by releasing the band 29 which involves supply of oil under pump pressure through branch line 129', bore of the manual valve, line 151 and branch 152 to the two pistons of the rear servo, moving these pistons to the right to release band-apply pressure. Simultaneously, any fluid remaining behind piston 31 of the clutch for the rear unit is exhausted through line 154 which extends to the bore of the manual valve to the left of land 156, from which point it can be exhausted through the open end of this bore. Thus the rear unit is in the same condition that prevails in neutral.

Oil being supplied to the rear unit through line 151 also has a part thereof continuing through branch line 232 to the right end of double transition valve 108, forcing this valve to the left (opposing compensator pressure having been exhausted) and closing the port connected to line 140. The purpose of this maneuver is to assure that the mechanism cannot advance to second speed operation even though governor pressure while operating in reverse might rise to a value high enough to operate the first to second shift valve 112. The line 140 extending from this shift valve supplies the necessary fluid under pressure to accomplish a first to second shift in the front unit and, since line 140 is arrested at the double transition valve, this upshift cannot occur.

With the front unit conditioned for direct drive; the rear unit conditioned as in neutral; and the reverse unit conditioned with its ring gear locked to ground, the mechanism is in order to convert rotation of the input shaft 11 in one direction to reverse rotation of the output shaft 37. Since the throttle is advanced, establishing throttle valve pressure, the plug 181 of the coupling regulator valve is moved upwardly, moving the valve 127 also upwardly, whereby drive in the fluid coupling takes place in the same manner as described in connection with first gear operation. The transmission of torque through the rear unit and the reverse unit has been described previously and is not repeated at this time.

Main line exhaust valve

Valve 149, shown in Fig. 3, is for the purpose of exhausting oil from the mechanism at a rapid rate when the engine is stopped so that the parking pawl can be engaged without undue loss of time. It will be noted that the supply line 129, which can receive oil either from the front or rear pumps, or both, in moving into the body of the valve 149 can force it upwardly against spring 149', permitting the oil to continue in line 129 to the manual valve body and elsewhere in the apparatus. Oil is also supplied to the piston 160 of the parking pawl to disengage it. When the engine is stopped and both pumps have ceased operation, the pressure in line 157 immediately decreases and the same is true in that part of the line 129 beneath valve 149. Spring 149' can then force the valve to its lowermost position connecting the parallel line 129" to exhaust through the top of the casing of this valve which is always open to the sump. In this manner oil which may have been in use in various parts of the apparatus, such as clutches, servo, etc., can be exhausted without imposing pressure on the line 157, which might delay engagement of the parking pawl.

Modified fluid coupling

The modification shown in Fig. 5 differs from that of Figs. 1 and 2 mechanically in that instead of having the turbine 21 of the fluid coupling connected directly to the intermediate shaft 24, the turbine is connected to this shaft through the agency of a one-way roller or overrunning clutch 600. This mechanism operates to permit the intermediate shaft 24 to rotate freely in forward direction relative to the turbine 21, but to be prohibited from reverse direction relative thereto. In other conditions, when the turbine 21 is rotating in a forward direction and transmitting torque, the shaft 24 must rotate with it or rotate at a speed in excess of turbine speed.

The purpose of this arrangement is to make possible filling of the coupling in all ratios or positions of the manual valve except neutral, but to deactivate the coupling in second and fourth speed to simulate the action obtained by emptying the coupling without performing that operation. Thus, when the lockup clutch, actuated by piston 60, is applied and the sun gear 15 and ring gear 16 of the front planetary unit are locked together, the coupling becomes stationary, but at the same time the shaft 24 is permitted to rotate without causing rotation of the turbine 21 with attendant frothing and heating of oil.

As the result of the utilization of the freewheeling overrunning clutch 600, it is possible to eliminate from the controls of the apparatus the regulating valve 145 and parts associated therewith, shown in Fig. 2 and described in the operation of the mechanism.

Fig. 5 can replace Fig. 2 in association with Figs. 3 and 4 to complete the circuit diagram used with this modification of the invention, and the liquid conduits necessary for the operation of the modification have been shown as continuations of the appropriate conduits in Fig. 3. In Fig. 5 the front pump has been omitted, but the pressure supply line therefrom and the lubricating line have been indicated and identified by the same reference characters used in Fig. 2. Similarly, other parts which are identical with those of Fig. 2 have been given the same reference characters.

Another change resulting from the alteration of the fluid coupling resides in the lockup control valve 406 and its associated connections and the delayed relay valve having chamber 413 therein. Since the coupling is now supplied with fluid in all forward drive ratios and also in reverse, if the connection formerly used in filling the bore 413 were employed, the desired delayed action would not be obtained. Consequently, a connection is now provided wherein liquid from line 409, supplied to the bore 410 can also be supplied immediately by line 525 to the body 417 to enter bore 413 through the restriction 420.

Thus when the manual valve is positioned to condition the apparatus for driving range 3, the valve 406 is moved downwardly by the liquid supplied through line 405 connected to line 400 extending to the manual valve. This places lines 408 and 409 in communication through the bore of the valve 406 so that when oil is supplied to line 408 in the sequence of 2nd to 3rd shift, this oil can be introduced into the bore 413 to raise piston 412 against spring 414 and eventually permit oil to enter the bore 410 and pass therefrom through the line 422 to act on lockup clutch piston 60.

The other fluid lines associated with this modification perform the same functions as described in the detailed operation of the control system. Changes in ratio in the front unit are made in the same fashion as previously, with the exception that the overdrive brake piston 54 is applied directly by line 139 instead of being routed into operative association with the regulating valve which has been eliminated. It will be obvious that this brake can be applied without regard to relieving torque through the turbine 21 since as soon as the sun gear is locked to ground by the piston 54, the ring gear 16 can immediately drive the intermediate shaft 24 at an overdrive ratio. Likewise, timing of the release of this overdrive communication by exhaust of liquid through line 139 is no longer necessary since the turbine can begin rotating as the pump 20 rotates and pick up the load under the control of the freewheeling brake or overruning clutch 600.

From the foregoing it will be seen that the present invention, in any of the illustrated and described embodiments, provides a transmission wherein the control of a fluid coupling through the agency of filling and emptying the same; or through a one-way drive connection associated therewith, provides the necessary torque transmitting agency for obtaining desirable qualities. In certain forms of the invention provision is made for utilizing the controlled coupling in the highest gear ratio normally employed with a lockup clutch for the coupling serving to eliminate the slip inherent in the coupling. It is to be understood that other modifications of the invention can be made without departing from the scope of the following claims.

What is claimed is:

1. In a transmission for transmitting torque from a source of motive power to an output shaft, the combination of first and second gear units, each unit having a driving element, a driven element and a reaction element, the driving element of said first unit being connected to said source of motive power, a shaft driven by the driven element of said first unit and driving the driving element of said second unit, the driven element of said second unit being connected to said output shaft, a fluid coupling having its pump connected to one element of said first unit and its turbine connected to another element of said first unit, whereby torque is transmitted between the elements connected to the coupling for establishing substantially direct drive in said first unit, means for deactivating said fluid coupling when the reaction element in said first unit is held against rotation to establish drive through said first unit at a speed ratio other than direct drive, means for selectively establishing direct drive and drive at a speed ratio other than direct drive in said second unit, hydraulic controls operative to change the speed ratios in said units to provide four overall speed ratios in said transmission, means for adjusting said controls to restrict said transmission normally to a range of three overall speed ratios, and means for automatically locking together the elements connected to said fluid coupling a predetermined interval after said coupling establishes substantially direct drive through said first unit in the highest overall speed ratio in said restricted range.

2. In a plural step ratio transmission for a throttle controlled engine, a gear unit comprising a driving element, a driven element and a reaction element, means for holding said reaction member against rotation to establish geared drive in said unit between said driving and driven elements at a speed ratio other than direct drive, a fluid coupling having its pump connected to one of said elements and its turbine connected to another of said elements, means for filling said coupling with liquid to cause said coupling to transmit torque between the two elements connected thereto for establishing substantially direct drive through said unit between said driving and driven elements, means for emptying said coupling to prevent said coupling from transmitting torque between the elements connected thereto when said reaction element is held against rotation, a hydraulic governor driven by the output shaft of said transmission for developing hydraulic pressure varying with output shaft speed, and valve means influenced by engine throttle position and hydraulic pressure from said governor for controlling the pressure developed within said coupling.

3. In a plural step ratio transmission for a throttle controlled engine, a gear unit comprising a driving element, a driven element and a reaction element, means for holding said reaction member against rotation to establish geared drive in said unit between said driving and driven elements at a speed ratio other than direct drive, a fluid coupling having its pump connected to one of said elements and its turbine connected to another of said elements, means for filling said coupling with liquid to cause said coupling to transmit torque between the two elements connected thereto for establishing substantially direct drive through said unit between said driving and driven elements, means for emptying said coupling to prevent said coupling from transmitting torque between the elements connected thereto when said reaction element is held against rotation, a hydraulic governor driven by the output shaft of said transmission for developing hydraulic pressure varying with output shaft speed, and valve mechanism connected to the periphery of said coupling for controlling exhaust of liquid therefrom, said valve mechanism being influenced by engine throttle position and hydraulic pressure from said governor to vary the degree of coupling between said pump and turbine.

(References on following page)

References Cited in the file of this patent
UNITED STATES PATENTS

| | | |
|---|---|---|
| 2,235,370 | Jandasek | Mar. 18, 1941 |
| 2,264,478 | Lowther | Dec. 2, 1941 |
| 2,267,334 | Keller | Dec. 23, 1941 |
| 2,322,251 | Pollard | June 22, 1943 |
| 2,351,213 | James | June 13, 1944 |
| 2,365,879 | Jandasek | Dec. 26, 1944 |
| 2,378,085 | Jandasek | June 12, 1945 |
| 2,515,831 | McFarland | July 18, 1950 |
| 2,544,542 | Palen et al. | Mar. 6, 1951 |
| 2,645,135 | Frank | July 14, 1953 |
| 2,664,765 | Kelbel | Jan. 5, 1954 |
| 2,687,657 | Kugel et al. | Aug. 31, 1954 |
| 2,707,887 | Slack | May 10, 1955 |
| 2,749,767 | Ebsworth | June 12, 1956 |